United States Patent [19]

Campbell, Jr.

[11] Patent Number: 5,396,624
[45] Date of Patent: Mar. 7, 1995

[54] ACCOUNT FILE FOR OFF-LINE TRANSACTION AUTHORIZATION

[75] Inventor: Carl M. Campbell, Jr., Newtown Square, Pa.

[73] Assignee: Visa International Service Association, San Mateo, Calif.

[21] Appl. No.: 101,776

[22] Filed: Aug. 3, 1993

Related U.S. Application Data

[63] Continuation of Ser. No. 632,189, Dec. 20, 1990, abandoned.

[51] Int. Cl.⁶ ............... G06F 11/00; G06F 13/16; G06K 5/00
[52] U.S. Cl. ............................ 395/600; 395/650; 364/DIG. 1; 235/380
[58] Field of Search .............. 395/600, 650; 235/380

[56] References Cited

U.S. PATENT DOCUMENTS

| | | | |
|---|---|---|---|
| 3,696,335 | 10/1972 | Lemelson | 340/149 |
| 4,558,211 | 12/1985 | Berstein | 235/380 |
| 4,633,393 | 12/1986 | Rundell | 364/200 |
| 4,650,978 | 3/1987 | Hudson et al. | 235/380 |
| 4,822,985 | 4/1989 | Boggan et al. | 235/380 |
| 4,870,259 | 9/1989 | Boggan et al. | 235/380 |
| 4,885,777 | 12/1989 | Takaragi et al. | 380/30 |
| 4,991,087 | 2/1991 | Burkowski et al. | 364/200 |
| 5,016,274 | 5/1991 | Micali et al. | 380/23 |
| 5,018,196 | 5/1991 | Takaragi et al. | 380/30 |
| 5,121,495 | 6/1992 | Nemes | 395/600 |

OTHER PUBLICATIONS

H. Korth & A. Silberschatz, Database System Concepts, 2/e, McGraw–Hill, 1991, 1986, pp. 244–272.

Primary Examiner—Thomas G. Black
Assistant Examiner—Peter Y. Wang
Attorney, Agent, or Firm—Heller, Ehrman, White & McAuliffe

[57] ABSTRACT

An approach for handling data representative of invalid transaction cards is disclosed. A memory area 34 in a transaction terminal 16 is divided into a plurality of stacks. Two digits of the invalid account number are used to identify the stack into which the remainder of the account number is added. Stack start pointers are provided for file management. As the newest entries are added to the list, the oldest entries are purged. The subject system allows a large number of accounts to be stored in a minimum of space. Updates of the file can be easily handled during direct communication sessions between a central processor 12 and the terminal 16.

17 Claims, 7 Drawing Sheets

| STACK # | | ADDRESS |
|---|---|---|
| 00 | STACK START POINTER | 14202 |
| 00 | STACK TOP POINTER | 14200 |
| 01 | STACK START POINTER | 14239 |
| 01 | STACK TOP POINTER | 14238 |
| 02 .. 48 | POINTERS | |
| 49 | STACK TOP POINTER | 16075 |
| 49 | STACK START POINTER | 10061 |

FIG. 5

ACCOUNT FILE FOR OFF-LINE TRANSACTION AUTHORIZATION

This is a continuation of application Ser. No. 07/632,189, filed Dec. 20, 1990, now abandoned.

TECHNICAL FIELD

The subject invention relates to transaction terminals capable of authorizing transactions in an off-line manner. A improved approach is described for transmitting and storing lists of account numbers of invalid transaction cards.

Background of the Invention

A large percentage of transactions are now completed using a transaction card, rather than cash or checks. A small, but significant percentage of all such transactions generate losses due to improper usage of the cards. Such improper usage can include exceeding the credit limit of the card. The definition of improper use also includes continued purchases while failing to pay monthly minimum charges. Various fraud scenarios also contribute to this loss. For example, purchases are made with cards that have been lost or stolen.

Many approaches have been implemented to reduce these losses. One of the earliest approaches used to combat these losses was to distribute a printed list of invalid cards, the use of which would be considered improper as defined above. The merchant would be asked check the account number on the card presented for the transaction with the account numbers printed in the list. If the account number is listed, the transaction would be declined.

The use of such a printed list is effective in reducing a large percentage of fraud losses. Unfortunately, this approach has a few drawbacks. For example, a transaction card is often used almost immediately after it has been lost or stolen. This immediate use will occur before the card has been listed or before the list has been distributed.

Because of these difficulties, other, more sophisticated techniques have been implemented. One of the most effective schemes is to authorize every transaction through a real-time, on-line communication network. For example, an automated transaction terminal at the merchant can transmit the account number of the card presented for a transaction to a central processor. The account number of the card can then be checked against a current list of invalid card numbers stored either at the central processor or at the card issuer.

This on-line scheme eliminates the lag time inherent in distributing printed lists of invalid cards. Furthermore, the cost of authorizing transactions is justified for high value transactions. However, for low value transactions, the losses tend to be lower and the benefits gained from on-line authorization do not justify the added costs and delay involved in obtained an on-line approval.

Accordingly, various approaches have been developed to authorize lower value transactions at the terminal, in an off-line manner. One approach is to provide the terminal with a list of invalid account numbers. One such system was disclosed in U.S. Pat. No. 3,696,335, issued Oct. 3, 1972 to Lemelson. The latter approach required that the entire list of invalid cards be transmitted to the terminals. This approach has been found to be impractical because the list is quite long and therefore requires large data storage capacity in the terminals. The list would also take a long time to transmit to the terminals.

Various suggestions have been made to overcome these problems. For example, U.S. Pat. No. 4,558,211, issued Dec. 10, 1985 to Berstein teaches that the list can be reduced by geographical criteria.

Still another approach which has been suggested is disclosed in U.S. Pat. No. 4,870,259, issued Sep. 26, 1989, to Boggan, and incorporated herein by reference. In this patent, a system is disclosed for generating a data compressed version of the invalid card list. This list was designed to carry account information for 100,000 invalid cards in only 125 kilobytes of memory. This data compressed version is much shorter and therefore requires less storage space in the terminal.

The compressed card list described in the Boggan patent is particularly suited to the situation where the entire list is broadcast daily over radio or television frequencies. In the situation where the information transfer is to occur to individual terminals over communication lines, the time allotted is extremely short and not sufficient to conveniently transmit a 125 kilobyte file. Accordingly, it would be desirable to provide an account storage system which could be kept current through a streamlined update process. It would also be desirable to construct a file architecture that would allow storage of account in numbers in a minimum amount of memory space.

Therefore, it is an object of the subject invention to provide a new and improved off-line transaction system.

It is a further object of the subject invention to provide simplified file structure for storing information about invalid cards.

It is another object of the subject invention to provide a file structure for storing account numbers which can be easily searched.

It is still a further object of the subject invention to provide a file structure for storing account numbers which can be easily updated.

It is still another object of the subject invention to provide a file structure for storing account numbers wherein old entries are automatically purged.

Summary of the Invention

In accordance with these and many other objects, an improved file architecture has been developed for an invalid card list which is intended to be stored in a transaction terminal located at the point of sale. The list will contain data representative of account numbers of invalid transaction cards. When a card is presented for a transaction, the account number will be checked against the file. If the account number is not on the list, the transaction could be approved by the terminal. If the account number is present, the transaction will be routed on to a central processor for further authorization.

The subject file is intended to be used with a transaction terminal that is described in greater detail in copending application Ser. No. 07/611,933, filed Nov. 9, 1990, now U.S. Pat. No. 5,177,342, and incorporated herein by reference.

In accordance with the subject invention, the size of the file and the data transmitted is reduced by initially reducing the length of the account number through a hashing procedure. A hashing procedure is defined as an algorithmic process which reduces the number of digits in the account number. In its simplest form, the account number can be hashed by truncating the most significant digits leaving only the least significant digits. In the preferred embodiment, the digits of the account number are combined and truncated to a number six digits long (three bytes in length) in order to enhance the level of randomness of the result.

It should be noted than when an account number is hashed, its uniqueness is lost. Accordingly, more than one account number might have the same hashed result. This means that a valid account number might be identified as invalid when compared to the list. Since the outcome of such an identification is merely to route the authorization request to a central source, some level of false positives is tolerable. It has been determined that an identification of two percent or less of the valid transactions as false positives is acceptable.

These hashed account numbers could be used to form a straightforward, single list. However, a single list has two disadvantages. The first is that each entry requires that the entire hashed account number (three bytes) be stored in memory. Secondly, the entire list must be searched in order to determine if the account number is present.

To avoid the latter problem, the list could be arranged in numerical order to permit a binary search. However, this approach requires that the list be reordered upon each new entry. It would also make it more difficult to purge older entries.

In order to minimize the file management requirements, in the preferred embodiment of the subject invention, the memory area allocated for the list is divided into a plurality of stacks. Two of the digits in the hashed account number are used to identify the stack where the account number belongs. Only the remaining four digits of the account number will be stored. When an account number presented for the transaction is to be compared with the list, the same two digits will be used to determine the stack where the account number might be located. Only this stack needs to be searched.

As can be appreciated, this approach addresses both problems discussed above. First, only a portion of the hashed account number need be stored thereby reducing memory requirements. Secondly, the search is easier and faster because only the stack where the account number belongs is searched.

In the preferred embodiment of the subject invention, the oldest entry in each stack is replaced with the most current entry to the stack. In this manner, the length of the list and therefore the memory requirements can be minimized. An approach is also disclosed for actively purging account numbers that have resided in memory for an overly long time period.

The criteria for the selection of the number of stacks will be discussed below. In general, the more stacks that are used in a given space, the faster the search will be. However, as the number of stacks increases, more memory needs to be devoted to file management. The number of stacks selected to optimize these counter balancing criteria will vary with the type of terminal in which the system is implemented (i.e., speed of processor and memory availability). The subject approach is flexible and allows the choice to be made on a terminal by terminal basis and is independent of the data that is transmitted.

Further objects and advantages of the subject invention will become apparent from the following detailed description taken in conjunction with the drawings in which:

BRIEF DESCRIPTION OF THE DRAWING

FIG. 5 depicts a representation of stack pointer and stack start addresses.

DETAILED DESCRIPTION OF THE PREFERRED EMBODIMENT

Figure 1:
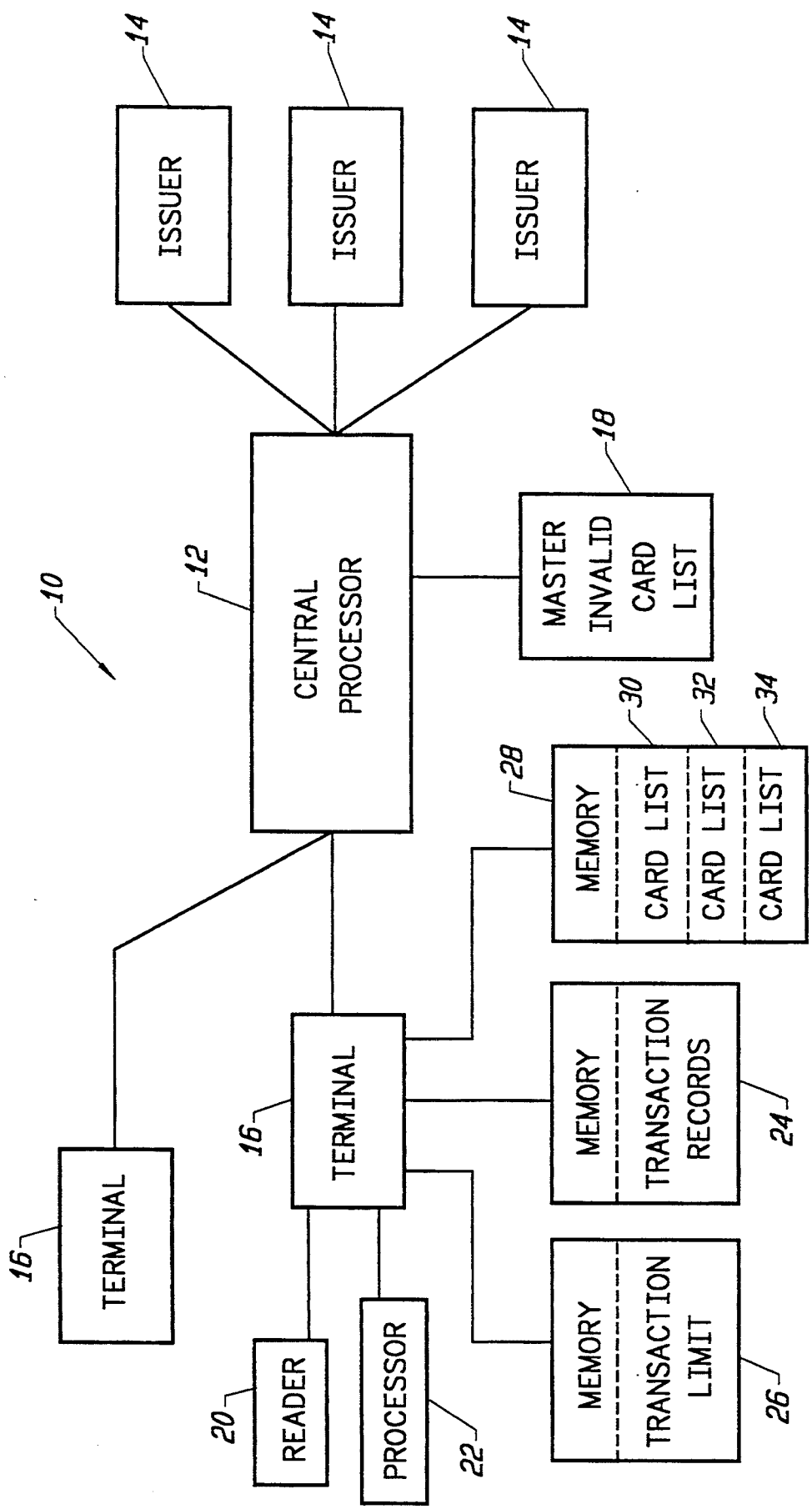
FIG. 1 is a block diagram of a transaction approval network within which the subject invention can be implemented.

Referring to FIG. 1, there is illustrated an overall block diagram of a transaction approval network 10 of the type in which the subject invention can be utilized. The network 10 includes a central processor 12 which functions as communication node between financial institutions that issue transaction cards (issuers 14) and terminals 16. As shown in FIG. 1, the terminals 16 can be directly connected to the central processor 12. In large transaction systems, there exists intermediate financial institutions and processors which act as intermediate communication nodes. For the purposes of describing the subject invention, the intermediate communication nodes can be considered transparent to the system.

In existing systems, the central processor can route requests for authorization information generated at a terminal 16 to the issuer 14 of the transaction card. The issuer will determine if a particular transaction can be approved. An appropriate response is generated by the issuer and transmitted back to the terminal.

If the issuer is unavailable, the central processor will act on the authorization request. To facilitate the evaluation of the transaction, the central processor maintains a list 18 of invalid cards, generated from information supplied by the issuers (See FIG. 2, step 42). The central processor consults that list in determining whether a particular transaction can be approved (See FIG. 3, steps 68 and 69).

As noted above, many existing transaction terminals are equipped to authorize a certain percentage of transactions in an off-line manner, without contacting the central processor. These existing terminals include a reader 20, processor 22 and an electronic memory. The design of such terminals is well known to those skilled in the art and need not be discussed. The subject invention can be implemented in the latter type of terminals with the modifications discussed below.

In the more recently developed terminals, an area 24 in memory is provided for maintaining a record of all transactions carried out by the terminal. These terminals are referred to as data capture terminals. The transaction records stored in memory area 24 are typically downloaded to the central processor 12, once a day, in a batch process. This information is used by the central processor to generate billing information which is then supplied to the respective issuers. The card issuers will then generate the bills that will be sent to the cardholder. As will be discussed below, the communication session during which the transaction data is transmitted to the central processor can also be used to update the information about invalid cards.

In order to authorize a transaction locally, in an off-line manner, an existing terminal will carry out a number of tests. For example, the terminal will determine if the card has expired by comparing the expiration date to the current date. The terminal can also determine if the account number is in an allowable format so that some counterfeit cards can be identified.

The terminal will also determine if the transaction amount is below an internally set transaction limit stored in memory area 26. If the transaction amount exceeds the transaction limit, a request for authorization information will be generated and transmitted to the central processor. The central processor will supply a response to the terminal, based on information from its own data base or based on a communication with the issuer. If the transaction amount is below the transaction limit, then the terminal will perform other tests to determine if the transaction can be authorized.

These additional tests include comparing the account number of the card presented for the transaction with a table of account numbers stored in memory area 28. As described in above cited patent application Ser. No. 07/611,933, now U.S. Pat. No. 5,177,342, in the preferred embodiment, the table of account numbers is divided into three lists 30, 32 and 34. The first list 30 contains accounts numbers of cards which are associated with a transaction that provoked an on-line request for authorization information at that terminal and the response from the central processor was to decline the transaction. In this case, the account number is clearly suspect and any future use of the card should be scrutinized. By placing the account number on this list, an on-line request will be generated for each subsequent use of the account number even if the transaction amount is below the transaction limit.

The second list 32 contains account numbers of all cards which have been involved in transactions that have been approved off-line. By this approach, the second use of the card at that terminal will provoke an on-line request for authorization information. The system will therefore allow a single fraudulent use below the transaction limit but will stop a second use. It has been found that a common fraudulent activity pattern includes multiple low value transactions at a single terminal. Recording account numbers associated with transactions that have been approved off-line will prevent such a fraud scenario. Once again, when the list is full, the oldest entry can be deleted to make room for the most current entry.

The third list 34 contains account numbers of invalid cards that have been compiled by the central processor and transmitted to the terminal based on information contained in the master card list 18. In the preferred embodiment of the subject invention, the list generated by the central processor should be limited to a small subset of invalid cards that have been reported actually used in the narrow geographical area where the terminal is located. In addition, this list can be limited to cards that have been used in similar terminals which will most likely be placed in high volume, low value environments.

As noted above, in a typical system, a mechanism is provided for daily reporting of all transaction activity from data capture terminals to the central processor. Thus, the central processor can compare these transmitted transaction records with its list of invalid cards and accurately compile a list of fraudulent cards that were used in a given region.

Since the communication session between the terminals and the central processor is relatively short, an approach for transmitting this card list must minimize the transfer time. Further, since the existing terminals do not have extensive memory regions, the approach must make maximum use of available space. It is expected that the area 28 in memory devoted to storing the invalid card lists will be less than five kilobytes. Lists 30 and 32 can be implemented in a relatively small amount of memory. List 34 and the supporting code will need to exist in less than four kilobytes of memory if the subject invention is implemented in existing terminals where only a minimum amount of memory is available.

In order to achieve these goals, memory area 34 is divided into a plurality of stacks as shown in Table 1 below (See FIG. 2, step 40).

TABLE 1

| MEMORY ADDRESS | HASHED ACCOUNT NUMBER | |
| --- | --- | --- |
| 14200 | 7634 | |
| 14201 | 8507 | |
| 14202 | 3212 | |
| 14203 | 6958 | STACK 00 |
| . | | |
| . | | |
| 14237 | 4137 | |
| 14238 | 0990 | |
| 14239 | 7547 | |
| 14240 | 8301 | STACK 01 |
| . | | |
| 14275 | 6062 | |
| 14276 | 9385 | |
| 14277 | 5471 | STACKS 02–48 |
| . | | |
| . | | |
| 16061 | 2642 | |
| . | | STACK 49 |
| 16099 | 3565 | |

Figure 4:
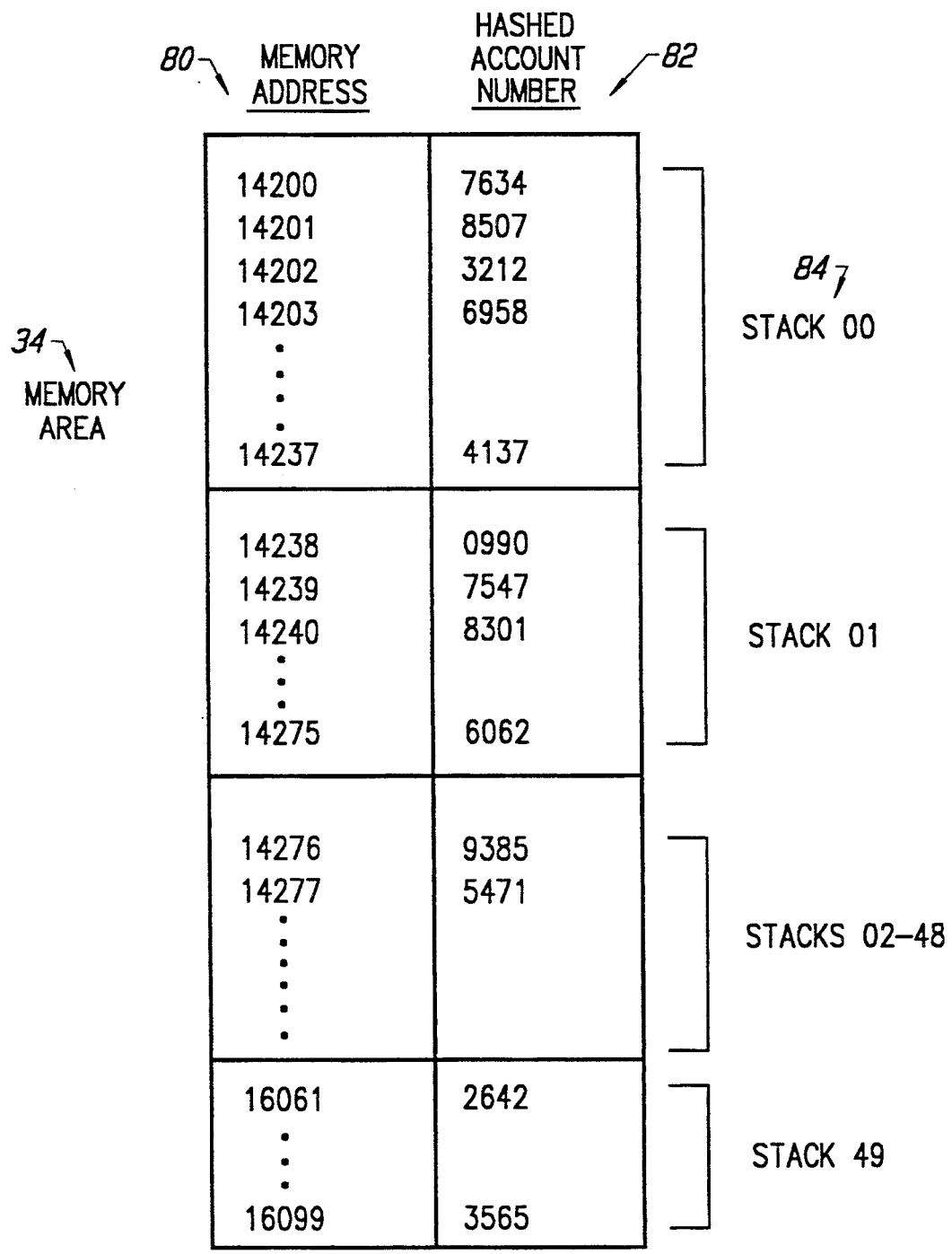
FIG. 4 depicts the terminal memory divided into a plurality of stacks.

As shown in Table 1 and FIG. 4, memory 34 is divided into 50 stacks 84. For convenience, each memory address 80 is shown as being two bytes in length. In addition, a counter is provided which holds the address of the account number which has most recently been added to the stack. This pointer is shown as the stack start pointer in Table 2 (See FIG. 2, steps 52 and 54). The next successive address would be the oldest entry in the stack and the location where the next entry will be made (See FIG. 2 step 58).

TABLE 2

| STACK # | | ADDRESS |
|---|---|---|
| 00 | STACK START POINTER | 14202 |
| 00 | STACK TOP POINTER | 14200 |
| 01 | STACK START POINTER | 14239 |
| 01 | STACK TOP POINTER | 14238 |
| 02...48 | POINTERS | |
| 49 | STACK TOP POINTER | 16075 |
| 49 | STACK START POINTER | 10061 |

The subject approach also requires a mechanism for keeping track of the start and end addresses of each stack. One method of achieving the latter goal is to store the length of the stacks and the starting address of the memory 34. The stack number and length could then be multiplied and added to the first address of the first stack to derive the start address of the selected stack. This approach requires that the stacks be set up consecutively in the memory.

Alternatively, and to avoid extra processing time, pointers which hold the addresses of the beginning and the end of the stacks could be used. Even if the latter approach is taken, it is still desirable to set up the stacks consecutively in memory so that the start address of one stack is one address greater than the end address of the previous stack. In this manner, and as shown in FIG. 2, FIG. 5 and Table 2, only start pointers for each stack need be stored. When a stack top pointer address reaches the value of the next stack pointer during updates of the file, it is reset to the original stack start address (See FIG. 2, step 56).

The mechanism of using stack start pointers to hold the address of the most recent entry to the stack is simple to implement with a minimum number of software instructions. Accordingly, it should be used where memory space for storing both the account numbers and the code for implementing the system is limited.

Where additional memory is available, the general stack approach described herein can also be used. However, if the memory is broken into a very large number of stacks, the space needed to store the stack start pointers would also be large. Thus, at some level, it would be more efficient to add the necessary software instructions that would allow the stacks to operate in a push down manner wherein the newest entry is added at the top of the stack and the last entry is dropped off the bottom of the stack. In this approach, all the entries in each stack would be moved every time a new entry was made. The added software code needed to implement a push down stack of this type would be offset by the elimination of the stack start pointers.

The use of the stack technique reduces the number of entries which must be reviewed in order to determine if the account number presented for the transaction is stored in memory. This technique also reduces the amount of memory needed to store the account number because the two digits of the account number used to determine the stack in which the number should be entered are not stored. Only the remaining digits are stored in the memory.

Figure 6:
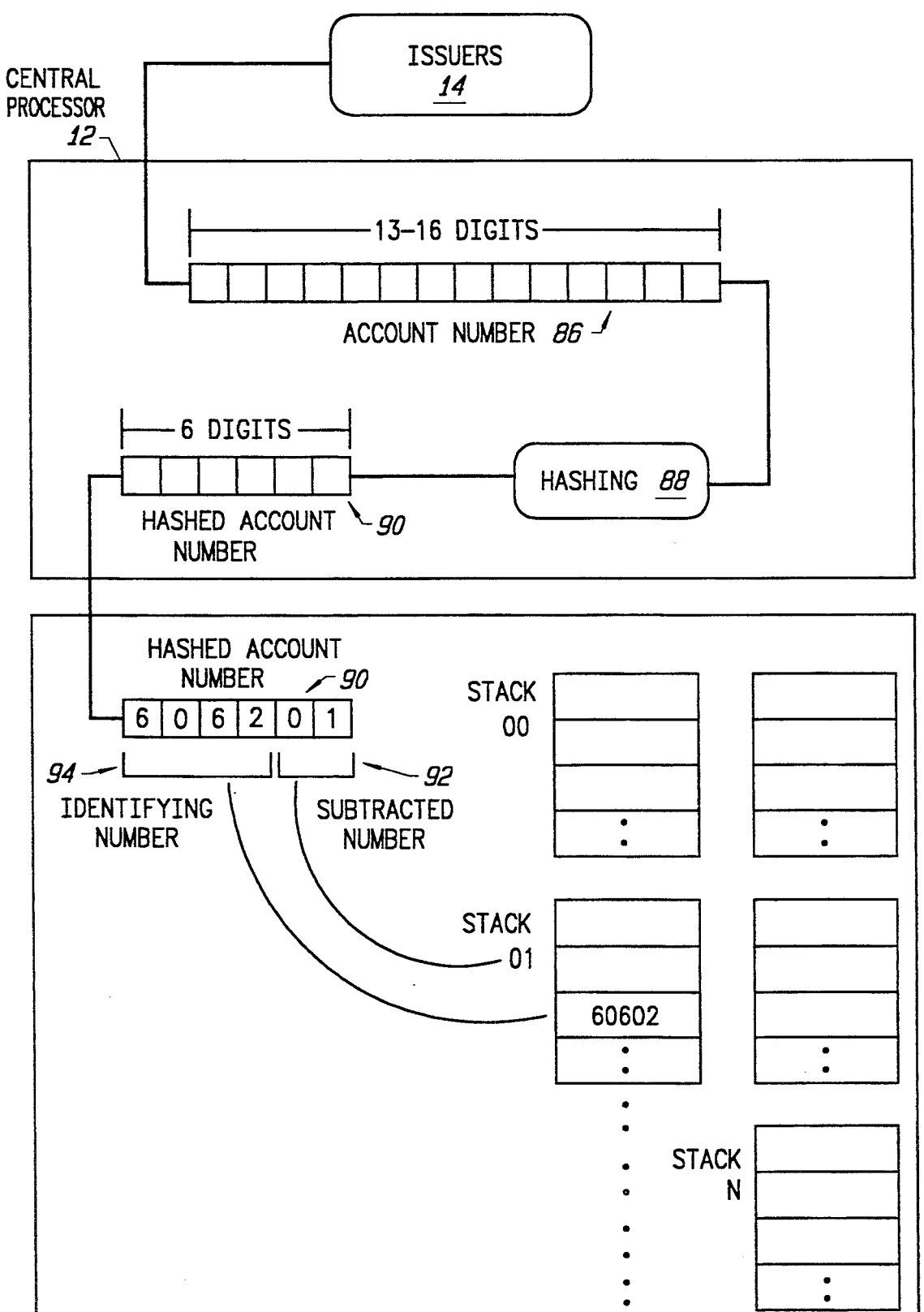
FIGS. 6 and 7 are a block diagram of the features of the present invention.

Referring now to FIG. 6, in the preferred embodiment of the subject invention, hashed account number 90 which is transmitted from central processor 12 to terminal 16 includes six digits in three bytes of data. A typical account number 86 is usually 13 or 16 digits in length. The desired six digits can be derived by simply truncating account number 86 to leave the six least significant digits. However, it is preferred to subject account number 86 to some algorithmic processing in order to increase the randomness of the result. This algorithmic process is called hashing 88. By insuring that the result is relatively random, the assumptions made about performance of the system (as discussed below) will be closer to reality.

One simple approach to hashing the account number is simply to add the six least significant digits with next six least significant digits, discarding any value in the result above six digits. The hashed result is transmitted by the central processor to the terminal during an update session (See FIG. 2, step 46).

Figure 2:
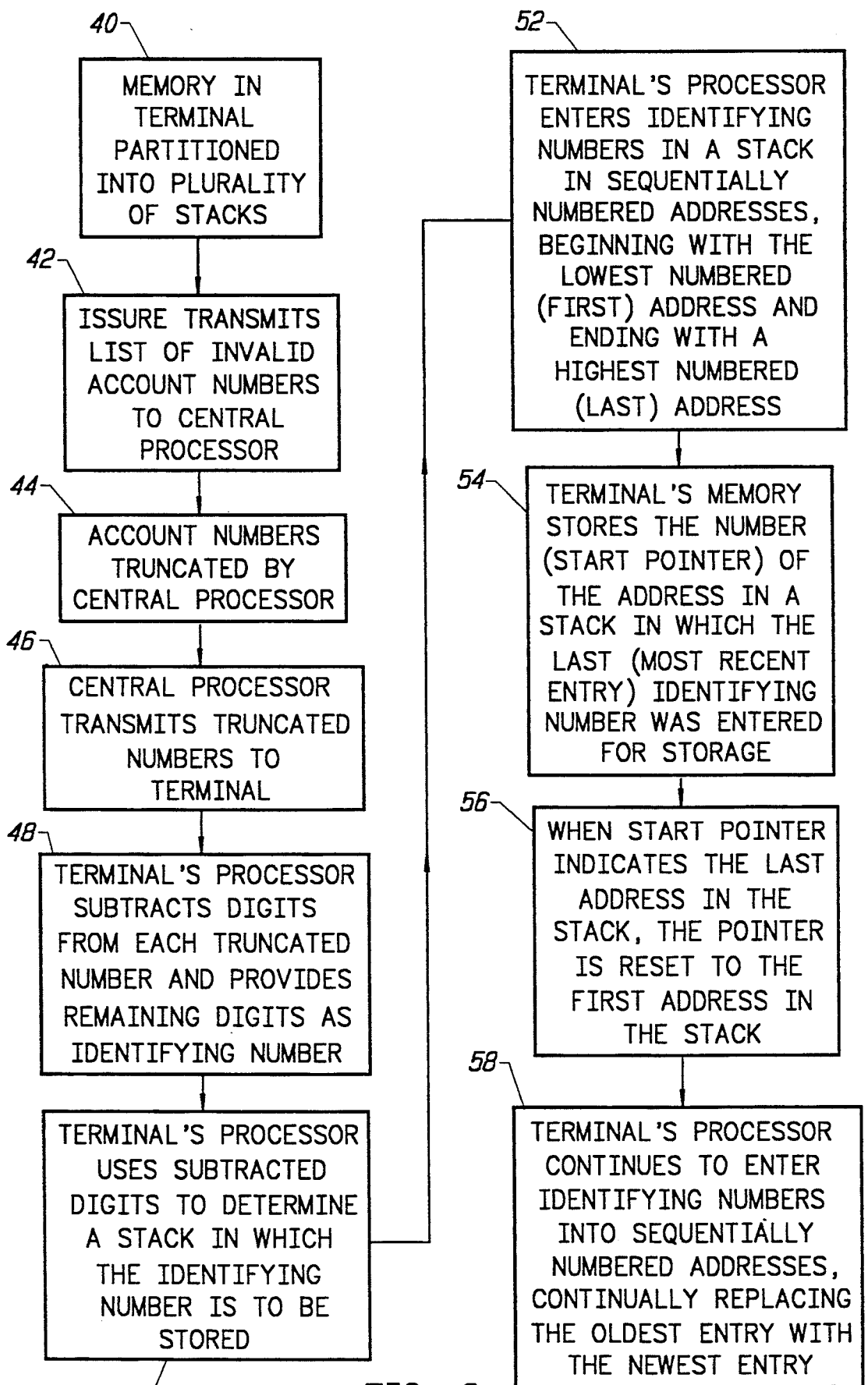
FIG. 2 is a block diagram schematically illustrating a method in accordance with the present invention for storing, in memory, in a transaction card network terminal a plurality of numbers representative of a plurality of transaction card account numbers.

When terminal 16 receives hashed account number 90 from central processor 12, terminal 16 first determines the stack into which it should be entered by reference to two of the six digits, subtracted number 92 (See FIG. 2, step 48). In the preferred embodiment, the least two significant digits are used, once again to maximize randomness. These digits will be between zero and 99. If the number is greater than the number of stacks, then the number of stacks is subtracted from the digits until a number between zero and the number of stacks is derived.

For example, assuming the hashed six digit account number is 603176, then the two digit number will be 76. If there are 25 stacks, the following steps will be taken:
1) 76−25 =51
2) 51−25 =26
3) 26−25=01

In this example, the second stack (stack 01) will have been identified as the stack into which the remainder of the account number will be entered. The processor will then locate the stack and determine where in the stack the remaining digits should be stored. In the latter example, the processor will read the stack start pointer for stack 01 which FIG. 5 and Table 2 holds address 14239. The processor with then increment the stack start pointer address to be equal to 14240 shown in FIG. 4 and Table 1. The processor will then enter the remaining four digits (6031) into memory area 14240 (See FIG. 2, step 48), replacing the digits 8301 which had been stored at that address. This process is carried out for each account number received during the update session. It should be noted that when the address of the stack start pointer reaches the start top address for the next stack, it is reset to the original stack top address (See FIG. 2, step 56).

In the case where the processor calculates the address of the start of the stack (i.e. by multiplying the stack number times the stack length and adding the result to the starting address of the memory area) the stack start pointers will hold a value between zero and the length of the stack (i.e. 49). The latter value would be added to the computed start of stack address to determine where the remaining four digits should be added to the stack.

Figure 7:
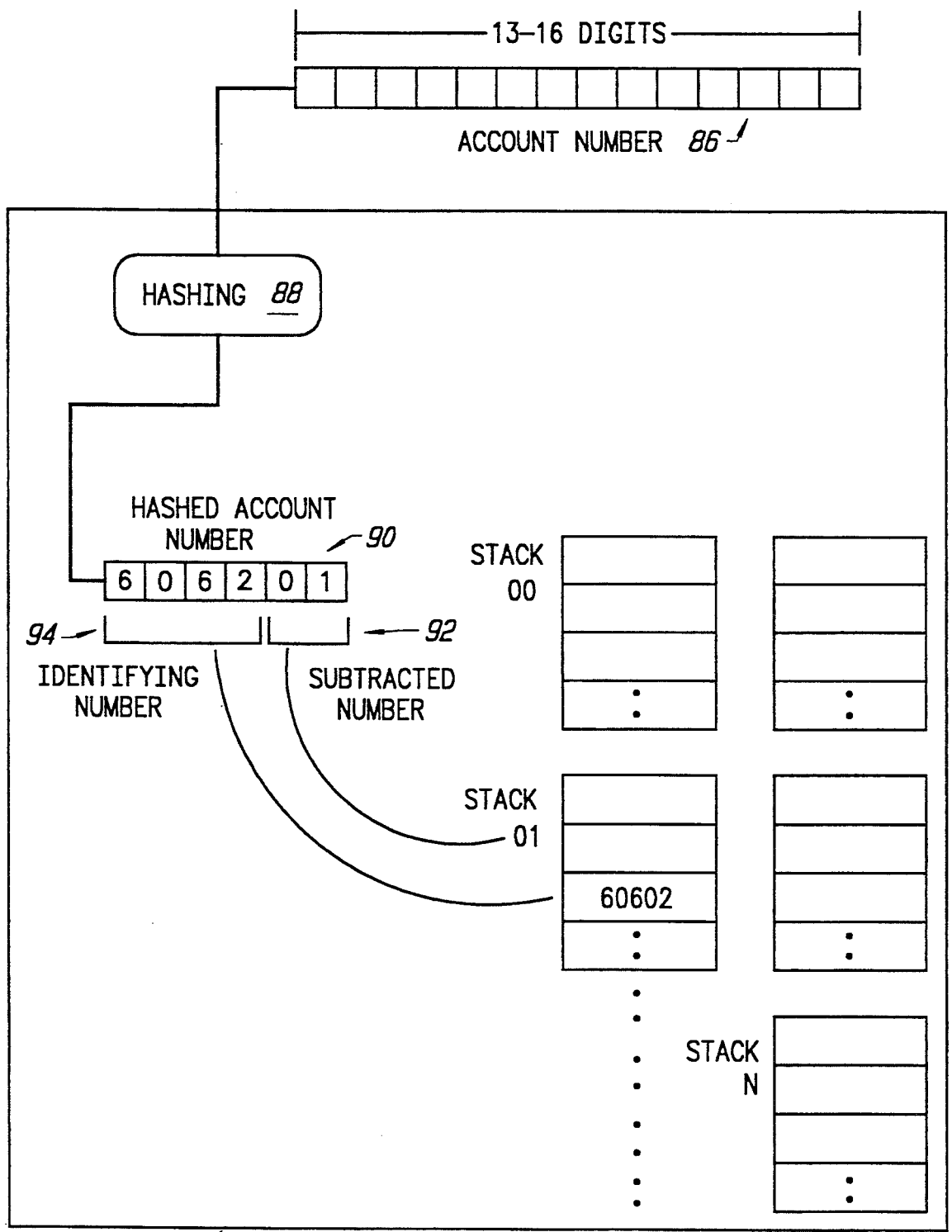

Referring now to FIG. 7, a similar process is performed when an account number 86 is presented to terminal 16 for a transaction. First, the processor in terminal 16 creates a six digit hashed account number 90 from account number 86 using the same hashing technique performed by central processor 12, of FIG. 6. Then the processor determines from subtracted number 92 which is the last two digits of the hashed account number, which stack a representation of account number 90 may be located. That stack is then searched for identifying number 94 which is the remaining four digits of the account number 90 (See FIG. 3, steps 60–66).

As can be appreciated, using this approach, only two bytes are required to store each hashed account number in the memory. In addition, only a small percentage of the file needs to be searched. In the case of 50 stacks, only two percent of the file is searched.

As noted above, one additional advantage of the subject approach is that in can be customized to each terminal based on its construction and location. The only system wide parameter needs to be the initial hashing algorithm used to derive the six digits from the account number. Even this step can have some flexibility since the central processor can store information as to the approach being used by the terminal.

The selection of the number of stacks will depend on the length of the memory, the desired speed of the search, the average length of time the entry should remain in the file and the percentage of false positives that would be generated. As noted above, a certain percentage of valid account numbers will be identified through this method resulting in an on-line request for verification. Some level of false positives are tolerable in exchange for less storage requirements and faster transmission of data. In addition, the generation of false positives add a certain element of randomness into the process of generating on-line authorization requests which is desirable to foil improper usage by persons knowledgeable about the system.

Table 3 below compares the various results that would be achieved using different memory sizes with one stack, 25 stacks, 50 stacks and 100 stacks. This statistical analysis assumes that there are an average of 110 new invalid card entries per day. The analysis also assumes that the hashing process produces random results.

A comparison is made for each combination of memory size and number of stacks, which includes the number of accounts numbers which can be stored; the number of account numbers which must be searched per transactions, the percentage of false positives and the expected residency time of the account number in the file before it is actually purged by a later entry. In the latter comparison, an average number of days is given that the account number will still be present in the file. In addition, an approximation is given for the number of days for a given probability that the account number will still be present in the file.

Considering for example, the third line of the Table 3 below, it will be seen that if four kilobytes of memory are available and that memory is allocated to 50 stacks, 1900 account numbers could be listed. In this case, some 200 bytes are allocated for stack pointers. During each transaction, only 38 two byte account numbers must be searched. The false suspect rate would be 0.4%.

Any particular account number would reside in the file for an average of 17.3 days. There is a 90% probability that any given account number will still be present in the file for at least (approximately) 14 days, a 97% probability that it will be present for at least 13 days and a 99% probability that it will still be present for at least 12.5 days. File residency times are in inverse proportion to the number of daily entries. Thus, to convert a value in Table 3 from the 110 average file-entries per day to, for example, 90 average file-entries per day, the value in days would be multiplied by 110/90. Using this statistical information, the central processor can determine if it is necessary to retransmit an invalid account number that had previously been sent to the terminal. The automatic purging feature helps to minimize the amount of memory space needed to store relevant invalid account numbers.

TABLE 3

| MEMORY SIZE, BYTES | NUM. OF STACKS | NUM. OF ACCT. NUMS. | PER-TRANSACT. COMPARES | FALSE SUSPECT RATE | FILE RESIDENCY @ 110 AV. ENTRIES/DAY (In days, for stated probabilities) | | | |
|---|---|---|---|---|---|---|---|---|
| | | | | | AV. | 90% | 97% | 99% |
| 4K | 1 | 1,333 | 1,333 | 0.1% | 12.1 | 10 | 9.5 | 9 |
| 4K | 25 | 1,950 | 78 | 0.7% | 17.7 | 14.5 | 13.5 | 12.5 |
| 4K | 50 | 1,900 | 38 | 0.4% | 17.3 | 14 | 13 | 12.5 |
| 4K | 100 | 1,800 | 18 | 0.2% | 16.3 | 12.5 | 11 | 10.5 |
| 5K | 1 | 1,666 | 1,666 | 0.2% | 15.2 | 12.5 | 11.5 | 11 |
| 5K | 25 | 2,450 | 98 | 1.0% | 22.3 | 18.5 | 17.5 | 16.5 |
| 5K | 50 | 2,400 | 48 | 0.5% | 21.9 | 18.5 | 17 | 16 |
| 5K | 100 | 2,300 | 23 | 0.2% | 20.9 | 16.5 | 15 | 14 |
| 6K | 1 | 2,000 | 2,000 | 0.2% | 18.2 | 15 | 14 | 13.5 |
| 6K | 25 | 2,950 | 118 | 1.2% | 26.8 | 22.5 | 21 | 20 |
| 6K | 50 | 2,900 | 58 | 0.6% | 26.4 | 22.5 | 21 | 20 |
| 6K | 100 | 2,800 | 28 | 0.3% | 25.4 | 20.5 | 18.5 | 17 |
| 8K | 1 | 2,666 | 2,666 | 0.3% | 24.2 | 20.5 | 19 | 18 |
| 8K | 25 | 3,950 | 158 | 1.7% | 35.9 | 30.5 | 28 | 26.5 |
| 8K | 50 | 3,900 | 78 | 0.8% | 35.4 | 31 | 29 | 28 |
| 8K | 100 | 3,800 | 38 | 0.4% | 34.5 | 28.5 | 26 | 24.5 |
| 10K | 1 | 3,333 | 3,333 | 0.3% | 30.3 | 25.5 | 23.5 | 22.5 |
| 10K | 25 | 4,950 | 198 | 2.0% | 45.0 | 38 | 35 | 33.5 |
| 10K | 50 | 4,900 | 98 | 1.0% | 44.5 | 37.5 | 35 | 33 |
| 10K | 100 | 4,800 | 48 | 0.5% | 43.6 | 37 | 34 | 32.5 |

As noted above, the file residency times predicted in Table 3 are based on statistical averages. In any given terminal, one or more stacks could be under utilized and therefore a particular account number could remain in memory for a much longer time. Very long residency times are not necessary since the frequency of improper usage of an invalid card drops off dramatically after the first few days of its initial listing. At the same time, the stale entry will cause a certain number of valid cards to be identified as possibly invalid as shown by the false suspect rates listed in Table 3. Therefore, it would be desirable to have an additional mechanism for purging older entries in the file.

This result can be achieved by storing one additional address for each stack in a date pointer register. In response to a reset command from the central processor on a given day, the address in the date pointer would be set to be equal to the address stored in the stack start pointer. This reset command can be given at preset intervals, for example, once every twenty days.

During update sessions which occur on any of the nineteen days between reset commands, the processor will add account numbers to the file as set forth above, which includes the step of incrementing the start stack pointer. In addition, each time the start stack pointer is incremented, it is compared with the date pointer. When the number of new entries to the stack is equal to the size of the stack, the two addresses will once again be equal. In this case, the entire stack will have been updated and any entries more than twenty days old would have been automatically purged. Therefore, there is no need to independently purge the file and the processor will clear the date pointer address.

In contrast, if twenty days has elapsed and the stack has not been fully replaced since the last reset command, the original address will still exist in the date pointer. Moreover, any account numbers that are located in addresses between the present stack start pointer and the date pointer will be at least twenty days old. Accordingly, in conjunction with the command to reset the date pointer, the processor can also purge all of the stale account numbers stored in the addresses between the stack start pointer address and the date pointer address.

It should be noted that since the address in the stack start pointer is reset to the top of stack when it reaches the address as the bottom of the stack, the purge between the address numbers in the pointers would only literally occur if the address in the stack start pointer is less than the address in the date pointer. If the address in the stack start pointer is greater than the date pointer, purging would begin at the entry after the stack start address and continue to the end of the stack. Purging would then continue from the top of the stack until the address in the date pointer is reached.

The purging sequence described above requires only one additional address pointer per stack. This approach will insure that no entries remain in the file longer than twice the reset period. In the example above, all entries between twenty and forty days old would be purged in conjunction with the reset command.

The above described purge feature can be further enhanced to narrow the window of old entries maintained in the stacks. For example, if it is desired allow the purging of entries greater than twenty days old and make sure that no entries are older than twenty-five days old, four date pointers would be used with a new date pointer being generated and stored every five days. As described above, each date pointer would be set to the address of the entry added that day. A reset command would be sent by the processor every five days. The processor could then purge all entries in addresses between the start pointer and the oldest date pointer eliminating account numbers that have been in memory greater than twenty days. Since this process would be repeated every five days, no account number would reside in memory longer than twenty-five days.

Figure 3:
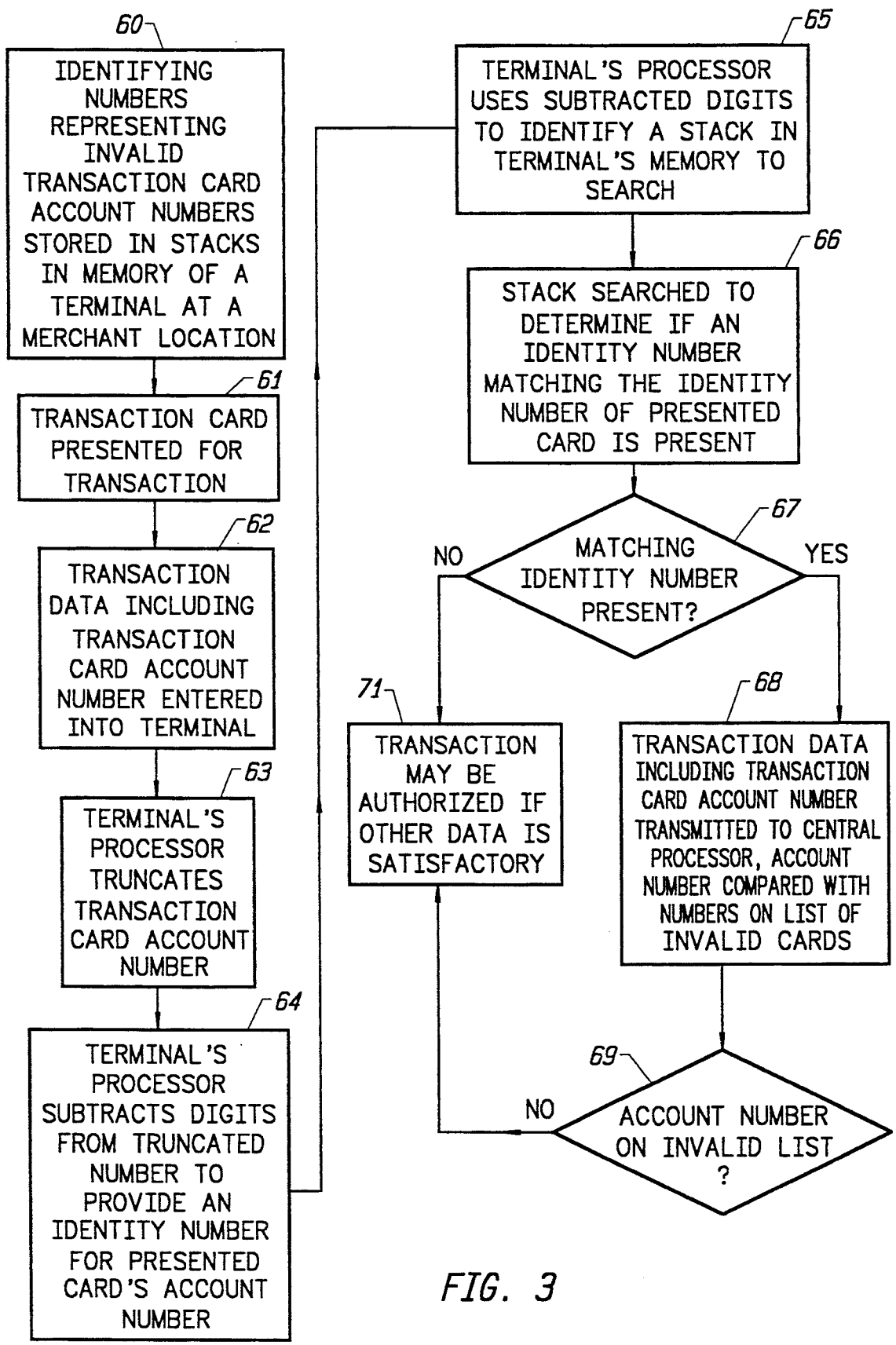
FIG. 3 is a block diagram schematically illustrating a method in accordance with the present invention for searching the terminal memory of FIG. 3 to determine if a stored identity number matches a number derived from a transaction card presented for a transaction.

As noted above, if the account number presented for the transaction is found in any of the lists in memory 28, an on-line authorization request will be generated (See FIG. 3, steps 68 and 69). In contrast, if the account number presented for the transaction is not present, and the transaction passes the other tests discussed above (i.e. valid expiration date, transaction amount below the limit, etc.) the terminal can generate an off-line authorization (See FIG. 3, step 71). Typically, an approval code is generated which is added to the sales draft. The parameters of the transaction are stored in memory area 24 and transferred to the central processor at a later time.

In summary, there has been provided a new approach for handling data representative of invalid transaction cards. A memory area 34 in a transaction terminal 16 is divided into a plurality of stacks. Two digits of the invalid account number are used to identify the stack into which the remainder of the account number is added. Stack start pointers are provided for file management. As the newest entries are added to the list, the oldest entries are purged. The subject system allows a large number of accounts to be stored in a minimum of space. Updates of the file can be easily handled during direct communication sessions between a central processor 12 and the terminal 16.

While the subject invention has been described with reference to a preferred embodiment, various changes and modifications could be made therein, by one skilled in the art, without varying from the scope and spirit of the subject invention as defined by the appended claims.

We claim:

1. A system for representing invalid transaction card account numbers in a credit card transaction network, said network including a central processor, and a merchant location including at least one transaction terminal for storing a list of invalid transaction card account numbers, said system comprising:

means for truncating a transaction card account number in said central processor to create a hashed number representing an invalid transaction card account, wherein said hashed number is smaller in length than said transaction card account number;

means for transmitting said hashed number from said central processor to said transaction terminal thereby transmitting a lesser number of digits to said transaction terminal, said transaction terminal including memory means partitioned into a plurality of stacks, each of said stacks including a plurality of addressed locations wherein each of said addressed locations stores a first identifying number representing an invalid transaction card account number, and processor means including means for truncating a predetermined length from said hashed number to create a second identifying number and a truncated number where said second identifying number represents said transaction card account number and said truncated number identifies a particular one of said stacks in which said first identifying number matching said second identifying number may be present, said processor means including means for selecting from said stacks using said truncated number a selected stack in which to store said second identifying number which is smaller in length than said hashed number when said first identifying number is not present.

2. A system for representing invalid transaction card account numbers in a transaction card transaction network, said network including a central processor, a transaction card issuer connected to said central processor, and a merchant location including at least one transaction terminal and processor means connected to said central processor for storing a list of invalid transaction card account numbers, said system comprising:

means for transmitting a transaction card account number from said issuer to said central processor;

means for truncating said transaction card account number in said central processor to create a hashed number representing an invalid transaction card account where said hashed number smaller in length than said transaction card account number;

means for transmitting said hashed number from said central processor to said transaction terminal thereby transmitting a lesser number of digits to said transaction terminal, said transaction terminal including memory means partitioned into a plurality of stacks, each of said stacks including a plurality of addressed locations, wherein each of said addressed locations stores a first identifying number representing an invalid transaction card account number, and processor means including means for truncating said hashed number to create a second identifying number and a truncated number where said second identifying number represents said transaction card account number and said truncated number identifies a particular one of said stacks in which said first identifying number matching said second identifying number may be present, said processor means including means for selecting from said stacks using said truncated number a selected stack in which to store said second identifying number which is smaller in length than said hashed number when said first identifying number is not present.

3. A system as recited in claim 2 wherein said selected stack stores a plurality of said first identifying numbers including an oldest entry and a most recent entry, and wherein said processor means further functions to delete said oldest entry in said selected stack when said second identifying number is stored by said processor means.

4. A system as recited in claim 3 wherein said processor means also functions to store a start pointer for each of said stacks in said memory means, said start pointer being defined as identifying a first address in one of said stacks in which the most recent entry of said second identifying number is stored.

5. A system as recited in claim 4 wherein said processor means further functions to store said second identifying number in said selected stack in a second address which is next in numerical sequence following said first address indicated by said start pointer.

6. A system as recited claim 5 wherein said processor means further functions to delete any previous entry of said first identifying number at said second address when said second identifying number is stored.

7. A system as recited claim 1 wherein a transaction card having a transaction card account number is presented to said terminal for a transaction, said terminal including:

means for truncating said transaction card account number to create a hashed number; and processor means including means for truncating a predetermined length from said hashed number to create a second identifying number and a truncated number, means for selecting said selected stack using said truncated number, means for searching said selected stack for said second identifying number, and means for generating an off-line authorization for said transaction if said second identifying number does not match said first identifying number located in said selected stack.

8. A system as recited claim 1 wherein said processor means further functions to store a date pointer for each of said stacks, said date pointer being defined as indicating a particular one of said addressed locations where said processor means entered said first identifying number on a given date and wherein said processor means further functions to delete a plurality of first identifying numbers stored in said memory means that were entered earlier than said given date.

9. A method of representing invalid transaction card account numbers for off-line transaction authorization in a transaction card transaction network, said network including a central processor, a transaction card issuer connected with said central processor, and a merchant location including at least one transaction terminal including a processor means connected to said central processor, said method comprising the steps of:

transmitting an invalid transaction card account number from a transaction card issuer to said central processor;

truncating said invalid transaction card account number in said central processor whereby said invalid transaction card account number is reduced in size and a smaller hashed number is created;

transmitting said smaller hashed number from said central processor to said transaction terminal;

partitioning said memory means in said transaction terminal into a plurality of stacks, each of said stacks including a plurality of addressed locations, wherein each of said addressed locations stores a first identifying number representing an invalid transaction card account number;

truncating said hashed number in said transaction terminal processing means to provide a second identifying number and a truncated number, wherein said second identifying number represents said invalid transaction card account number and said truncated number identifies a particular one of said stacks in which said first identifying number matching said second identifying number may be present;

searching said one of said stacks indicated by said truncated number by said processor means for said first identifying number matching said second identifying number; and storing said second identifying number, which is smaller in length than said hashed number, in said one of said stacks indicated by said truncated number when said first identifying number matching said second identifying number is not found.

10. The method of claim 9 further including the steps of:

entering transaction data into said transaction terminal including a transaction card account number of a card presented for a transaction;

truncating said transaction card account number in said processor means to provide said hashed number;

generating said second identifying number and said truncated number by truncating said hashed number in said processor means;

determining from said truncated number a selected stack from said stacks for searching;

searching said selected stack to determine if said second identifying number generated from said transaction card account number matches any said first identifying number stored in said selected stack; and authorizing said transaction off-line in said transaction terminal when said second identifying number does not match any said first identifying number stored in said selected stack.

11. The method of claim 10 further including the step of transmitting said transaction data including said transaction card account number to said central processor for authorization of the transaction if said second identifying number generated by said processor means matches any said first identifying number stored in said selected stack.

12. The method of claim 10 further including the step of storing a start pointer for each of said stacks, said start pointer defined as indicating a first memory address in one of said stacks in which the most recent entry of said first identifying number is stored.

13. The method of claim 12 further including the step of entering said second identifying number in a second memory address which is numbered next in numerical sequence to said first memory address indicated by said start pointer.

14. The method of claim 13 wherein if said second memory address numbered next contains a previous entry of said first identifying number, then said previous entry is replaced with said second identifying number by said processor means.

15. The method of claim 11 wherein each of said stacks includes a first address and a last address and when said start pointer indicates said last address in one of said stacks, said second identifying number is entered in said first address of said one of said stacks and said stack pointer is reset to said first address.

16. A system as in claim 1 wherein said memory means partitioned into a plurality of stacks is less than 125 kilobytes.

17. A system as in claim 2 wherein said memory means partitioned into a plurality of stacks is less than 125 kilobytes.

* * * * *